United States Patent [19]

Ogawa et al.

[11] 4,255,296

[45] Mar. 10, 1981

[54] POLYBUTADIENE RUBBER COMPOSITION

[75] Inventors: Masaki Ogawa, Sayama; Tamio Araki, Kodaira, both of Japan

[73] Assignee: Bridgestone Tire Company Limited, Tokyo, Japan

[21] Appl. No.: 964,310

[22] Filed: Nov. 28, 1978

[30] Foreign Application Priority Data

| Dec. 2, 1977 | [JP] | Japan | 52-144021 |
| Dec. 2, 1977 | [JP] | Japan | 52-144022 |
| Aug. 9, 1978 | [JP] | Japan | 53-96198 |

[51] Int. Cl.³ .................. C08L 89/00; C08F 136/06
[52] U.S. Cl. .......................................... 260/5; 260/42; 260/42.44; 260/42.46; 260/42.47; 525/86; 525/87; 525/98; 525/99; 525/314; 525/315
[58] Field of Search ........... 525/315, 314, 86, 87, 525/98, 99; 260/5, 42, 42.44, 42.46, 42.47

[56] References Cited

U.S. PATENT DOCUMENTS

| 3,140,278 | 7/1964 | Kuntz | 525/315 |
| 3,696,062 | 10/1972 | Lesage et al. | 260/5 |
| 3,827,991 | 8/1974 | Ando et al. | 525/315 |
| 3,852,225 | 12/1974 | Ishakawa et al. | 260/5 |

*Primary Examiner*—William F. Hamrock
*Attorney, Agent, or Firm*—Jordan and Hamburg

[57] ABSTRACT

This invention relates to a composition comprising a polybutadiene rubber containing a polymer obtained by block or graft polymerization of cis-1,4-polybutadiene with syndiotactic (syn)-1,2-polybutadiene, alone or blended with the other diene rubber, said syn-1,2-polybutadiene being crystallized and in a short fiber-like shape, and a breaking resistance characteristic and reinforcement characteristic being considerably improved by specifying the diameter and length of said short fiber, which is suitable for various parts of tire or industrial materials, and further relates to a composition of said polybutadiene rubber to which a carbon black is added for preferably used as a chafer or tread of tire, and still further relates to said composition to which a carbon black and an antioxidant are added for preferably used as a rubber blend composition for side wall.

10 Claims, No Drawings

POLYBUTADIENE RUBBER COMPOSITION

This invention relates to a composition comprising a polybutadiene rubber containing a polymer obtained by block or graft polymerization of cis-1,4-polybutadiene with syndiotactic(syn)-1,2-polybutadiene, alone or blended with the other diene rubber, said syn-1,2-polybutadiene being crystallized and in a short fiber-like shape, and a breaking resistance characteristic and reinforcing characteristic being considerably improved by specifying the diameter and length of said short fibers, which is particularly suitable for various parts of tyre or industrial materials such as belts, hoses, etc.

Furthermore, the present invention relates to a polybutadiene rubber composition comprising said polybutadiene rubber and said other diene rubber and further containing high quality carbon black, an abrasion resistance being improved thereby, so that such composition being suitable for rubber chafer (or rim cushion) and tread rubber.

Still further, the present invention relates to a polybutadiene rubber composition comprising said polybutadiene rubber and said other diene rubber and further containing low quality carbon black and an antioxidant of p-phenylenediamine, a flex resistance, crack growth resistance, weather resistance and workability being improved thereby, so that such composition is suitable as a rubber blend composition for side wall.

Since cis-1,4-polybutadiene has a good flex resistance, a good abrasion resistance, etc., it has been so far much used in various parts of tyre such as side wall, rubber chafer (or rim cushion) or tread, or the like, but it has a poor workability; for example, in appearance of roll baggy, in low strength after vulcanization or in high crack growth rate, etc. Owing to these disadvantages, it is used as blended with other diene rubber such as natural rubber, etc. but still a satisfactory result has not been obtained, and it is also difficult to use cis-1,4-polybutadiene in a high proportion.

On the other hand, a high speed performance is more and more required for tyres owing to the recent development of high speed way and the spread of radial tyres, and at the same time a rubber of high modulus of elasticity has been used around bead parts to prevent movements appearing at the bead parts. Thus, an increasingly large force is applied to a rubber chafer arranged between the im and bead, and the use of cis-1,4-polybutadiene so far used have been now limited because of said disadvantages.

Furthermore, in order to improve the high speed performance of tyre it is the current tendency to make the tread part and the bead part of tyre more elastic on one hand, and made the side wall part less elastic on the other hand, to weaken the impacts at the tread part. Thus, the flex resistance of the side wall part is more and more important, but the use of the conventional cis-1,4-plybutadiene has been now limited owing to the disadvantages as mentioned above. A high weather resistance such as ozone resistance, etc. is an important and necessary characteristic required for the side wall, but any satisfactory one has not been realized yet.

The present inventors have tried to make improvements by block or graft polymerization of cis-1,4-polybutadiene with syn-1,2-polybutadiene, but fluctuation in physical properties is large, though synthesized equally, and it has not been satisfactorily applied to light weight tyres or low fuel cost tyres which are recently in a larger demand.

As a result of further extensive studies to overcome said disadvantages, the present inventors have found that syn-1,2-polybutadiene to be block or graft polymerized with cis-1,4-polybutadiene is crystallized and is in a short fiber-like shape, and physical properties can be remarkably improved by specifying the diameter and length of the short fibers, with less fluctuation in physical properties.

The object of the present invention lies in a polybutadiene rubber composition comprising, as a main component, polybutadiene rubber containing polymers obtained by block or graft polymerization of cis-1,4-polybutadiene with syndiotactic (syn)-1,2-polybutadiene, alone or blended with other diene rubber in which a microstructures is of 78–93% by weight of cis-1,4-structures and 6–20% by weight of syn-1,2-structures, and at least 40% by weight of said syn-1,2-polybutadiene being crystallized and in a short fiberlike shape having an average diameter of 0.05–1$\mu$ and an average length of 0.8–10$\mu$;

and further the object of the present invention lies in a polybutadiene rubber composition blended with the other diene rubber as mentioned above, especially suitable for a chafer of tyre, in which a carbon black as said filler having an iodine absorption number (IA) of 76 mg/g or more and a dibutyl phthalate oil absorption number (DBP) of 90 ml/100 g or more is further combined by 40 to 100 parts by weight relative to 100 parts by weight of blended polybutadiene rubber prepared by blending 40 to 95 parts by weight of said polybutadiene rubber and 5 to 60 parts by weight of said other diene rubber, so that a pico abrasion index defined by ASTM D2228 of the polybutadiene rubber composition is 210 or more;

and still further the object of the present invention lies in a polybutadiene rubber composition blended with the other diene rubber as mentioned above, especially suitalbe for a vulcanizable rubber composition for side wall, in which a carbon black as said filler having an IA of 30 to 90 mg/g and a DBP of 130 ml/100 g or less is further combined by 30 to 100 parts by weight relative to 100 parts by weight of blended polybutadiene rubber prepared by blending 40 to 95 parts by weight of said polybutadiene rubber and 5 to 60 parts by weight of said other diene rubber, and an antioxidant of p-phenylenediamine group is still further combined by 0.5 to 8 parts by weight relative to 100 parts of said blended polybutadine rubber;

and still further the object of the present invention lies in a polybutadiene rubber composition blended with the other diene rubber as mentioned above, especially suitable for tyre tread, in which a carbon black as said filler having an IA of 60 mg/g or more and a DBP of 70 ml/100 g or more is combined by 30 to 100 parts by weight relative to 100 parts by weight of blended polybutadiene rubber prepared by blending 40 to 95 parts by weight of said polybutadiene rubber and 5 to 60 parts by weight of said other diene rubber.

The polybutadiene rubber of the present invention can be produced basically according to the process disclosed in Japanese Patent Publication Nos. 17666/1974 and 17667/1974. However, it is difficult to obtain rubber having equal properties constantly, even if synthesized equally according to such a process. It has been made clear through the studies made by the present inventors that such difficulty is due to crystallization of syn-1,2-polybutadiene in a short fiber-like shape during the polymerization, and the shape of the short fibers of syn-1,2-polybutadiene gives a great influence upon the properties of the resulting rubber, and further a change in the shape of the short fibers remarkably depends upon stirring conditions (shearing speed distribution and shearing speed) during the polymerization. That is, in more concrete terms, a ratio of average length/average diameter of the short fibers is decreased when the shearing speed distribution is disturbed and stirring is carried out in a nearly turbulent state, whereas the ratio of average length/average diameter is increased when the stirring is carried out in a nearly laminar flow state. On the other hand, the diameter of short fibers is decreased when the stirring is conducted so as to increase the shearing speed, whereas the length of the short fibers is increased when the stirring is conducted so as to decrease the shearing speed. Thus, it is possible to freely and readily change the shape of syn-1,2-polybutadiene short fibers in a wide range on account of catching such phenomena.

The microstructure of the polybutadiene rubber according to the present invention can be determined from the following two values in the following manner; the polybutadiene rubber is dissolved in n-hexane, and the soluble matter and the insoluble matter are separated from each other by centrifuge. The microstructure of the soluble matter is determined by infrared absorption spectra after the n-hexane has been removed from the soluble matter and the residues are dissolved in carbon bisulfide, whereas the microstructure of insoluble matter is determined, after drying, by infrared absorption spectra according to a tablet method of potassium bromide.

In the polybutadiene rubber of the present invention the content of syn-1,2-structure is particularly important, and is 6–20% by weight. If it is less than 6% by weight, only physical properties almost equal to those of the conventional cis-1,4-polybutadiene rubber are obtained, whereas, if it is more than 20% by weight, the viscosity is so high that a considerably adverse effect is given to the workability. However, if cis-1,4-polybutadiene rubber is added thereto, even in such a case, to adjust the content of syn-1,2-structure to not more than 20% by weight on the whole, the polybutadiene rubber of such a content can be satisfactorily used.

In the polybutadiene rubber of the present invention, the average diameter and average length of syn-1,2-polybutadiene short fiber can be measured in a manner as described later, but the average diameter is 0.05–1$\mu$ and the average length is 0.8–10$\mu$. If the average diameter is less than 0.05$\mu$, the breaking resistance characteristic of polybutadiene rubber is lowered, whereas the average diameter above 1$\mu$ is not preferable, because the flex resistance of polybutadiene rubber is lowered. On the other hand, if the average length is less than 0.8$\mu$, the crack growth resistance of plybutadiene rubber is lowered, whereas the average length above 10$\mu$ is not preferable, because the workability is considerably lowered. Furthermore, it is preferable that a ratio of average length/average diameter is at least 8, and when the ratio is above 8, the breaking resistance characteristic of polybutadiene rubber can be much more improved.

In the polybutadiene rubber of the present invention, it is necessary that at least 40% by weight of syn-1,2-polybutadiene is in short-fiber-like shape. If the proportion of short fiber is less than 40% by weight, the melting point of said shor fiber is lowered, while increasing a temperature dependency. As a result, the temperature dependency of polybutadiene rubber is also unpreferably increased. That is, the higher the tacticity of syn-1,2-polybutadiene, the more suitable the polybutadiene rubber composition of the present invention.

The plybutadiene composition of the present invention contains 40–95 parts by weight, preferably 50–95 parts by weight, of polybutadiene and 5–60 parts by weight, preferably 5–50 parts by weight, of other diene rubber, for example, such as natural rubber (NR), polyisoprene rubber (IR), styrenebutadiene copolymer rubber (SBR), cis-1,4-polybutadiene rubber, or mixtures thereof. If polybutadiene is less than 40 parts by weight, the flex resistance is poor, whereas if the diene rubber is less than 5 parts by weight, the workability is poor, and if it is more than 60 parts by weight, the amount of polybutadiene rubber is relatively reduced, and thus the flex resistance is unpreferably deteriorated.

In the polybutadiene composition of the present invention, a vulcanizing agent is sulfur, alkylphenol, disulfide, and 4,4'-dithiodimorpholine, and preferably is sulfur. Its blending proportion is in a range as used in the ordinary rubber blending.

In the polybutadiene rubber composition of the present invention, the inorganic filler is anhydrous silicic acid, calcium carbonate, magnesium carbonate, talc, iron sulfide, iron oxide, bentonite, zinc oxide, diatomaceous earth, white clay, clay, alumina, titanium oxide, and carbon black. An appropriate blending proportion thereof is 20–120 parts by weight per 100 parts by weight of polybutadiene in view of reinforcement ability and workability.

In order to apply the polybutadiene rubber composition of the present invention to the rubber chafer, the carbon black as the filler must be a relatively high quality carbon black having an IA of 76 mg/g or more, preferably 86 mg/g or more, and a DBP of 90 ml/100 g or more, preferably 105 ml/100 g or more. The carbon black having the IA of less than 76 mg/g and the DBP of less than 90 ml/100 g is not preferable, because it fails to show a satisfactory reinforcement effect as the rubber chafer.

Pico abrasion index defined according to ASTM D2228 is restricted to 210 or more in such polybutadiene rubber composition for the rubber chafer, because, if it is less than 210, no remarkable effect is observed upon the improvement, as compared with the conventional rubber chafer, whereas, if it exceeds 210, the desired object as the rubber chafer can be satisfactorily attained.

In order to apply the polybutadiene rubber composition of the present invention to a rubber blending composition for side wall, the carbon black as the filler must be a low quality carbon black having the IA of 30–90 mg/g, preferably 45–75 mg/g, and the DBP of 130 ml/100 g or less. If the IA is less than 30 mg/g, the particle size is so large that the reinforcement effect is decreased, and the flex resistance is thus lowered. If it is more than 90 mg/g, the reinforcement effect can be expected, but the fatique orientation is liable to appear, and the flex resistance is also lowered. Thus, such is not preferable. Its blending proportion is 30–100 parts by weight per 100 parts by weight of the polybutadiene rubber containing the other diene rubber, and if it is less than 30 parts by weight, any satisfactory reinforcement effect cannot be obtained. If it exceeds 100 parts by weight, the workability and the flex resistance are lowered.

The antioxidant of p-phenylenediamine group to be blended in the polybutadiene rubber composition for the rubber blend composition for said side wall is N-phenyl-N'-isopropyl-p-phenylenediamine, N,N'-diphenyl-p-phenylenediamine, N-phenyl-N'-(2,4-dimethyl)butyl-p-phenylenediamine, N-N'-di-2-naphthyl-p-phenylenediamine, etc, or the mixtures thereof, and its blending proportion is 0.5–8 parts by weight per 100 parts by weight of the polybutadiene rubber containing the other diene rubber. If it is less than 0.5 parts by weight, the roll baggy cannot be improved and also the antioxidizing effect is not satisfactory. If it exceeds 8 parts by weight, the antioxidant is dissolved at the kneading in Banbury mixer and plays a role of lubricant. That is, since the rotor slides on the rubber, a satisfactory kneading cannot be obtained, and the effect upon the antioxidant is lowered to the contrary.

In order to apply the polybutadiene rubber composition of the present invention to tread rubber of tyre, it is necessary that the weight average molecular weight of cis-1,4-polybutadiene is 350,000 or more. If it is less than 350,000, a satisfactory abrasion resistance necessary for the tread cannot be obtained. Furthermore, as the carbon black, carbon black having the IA of 60 mg/g or more, and the DBP of 70 ml/100 g or more is used. If the IA is less than 60 mg/g, a satisfactory abrasion resistance cannot be obtained. If the DBP is less than 70 ml/100 g, a satisfactory reinforcement effect cannot be obtained. Thus, in any case less number is not satisfactory. Its appropriate blending proportion is 30–100 parts by weight per 100 parts by weight of the polybutadiene rubber in view of its blending effect, workability as well as fatigue resistance.

The polybutadiene rubber composition of the present invention is quite distinguished in its flex resistance, the crack growth resistance and the breaking resistance characteristics, and is suitable to the tread, the rubber chafer of tyre, and the rubber blend composition for the side and can be applied to almost all the other parts. For example, its application to coating rubber, bead filler, belt end coating rubber, buffer rubber between a reinforcement layers, or inner liner is expected. Thus, the present polybutadiene rubber not only can greatly improve the overall properties of tyre, but also provide a novel material indispensable for the development of tyres having various functions including the low fuel consumption tyre of light weight now in the increasing demand.

The present invention will be described in detail below, referring to the Examples and the comparative Examples.

EXAMPLES 1–6 AND COMPARATIVE EXAMPLES 1–7

13 kinds of the polybutadiene rubber having different microstructures shown in Table 1—1 and Table 1-2 were used.

The average diameter and the average length of the short fibers were determined as follows: Various kinds of polybutadiene rubbers were extruded from a circular die having the diameter of 2 mm and the length of 10 mm to prepare the samples. The rubber component of the samples was dissolved in n-hexane by dipping for 48 hours, and the residues were freeze dried and dyed by osmium oxide ($O_sO_4$). Then, the resulting samples were enclosed by methyl methacrylate (MMA) and a very thin pieces were cut out from the samples by cutting them in the direction perpendicular to said extruding direction, and the diameters were measured by electron microscope. Likewise, very thin pieces were cut from the samples in parallel to said extruding direction, and the length were measured by electron microscope.

The average diameter and the average length were calculated according to the following formulae:

$$\bar{r} = \frac{\Sigma n_i r_i}{\Sigma n_i}, \bar{l} = \frac{\Sigma n_i l_i}{\Sigma n_i}$$

wherein
$\bar{r}$: average diameter of short fibers
$r_i$: diameter of short fibers
$\bar{l}$: average length of short fibers
$l_i$: length of short fibers
$n_i$: number of short fibers having a diameter $r_i$, or a length $l_i$.
$\Sigma n_i$: 300

TABLE 1-1

| Microstructure | | Sample | | | | | | |
|---|---|---|---|---|---|---|---|---|
| | | 1 | 2 | 3 | 4 | 5 | 6 | 7 |
| cis-1,4-structure | Weight % | 94.0 | 91.9 | 85.0 | 79.5 | 75.6 | 85.5 | 81.3 |
| trans-1,4-structure | Weight % | 1.0 | 1.4 | 2.4 | 2.8 | 3.2 | 2.2 | 2.5 |
| syn-1,2-structure | Weight % | 5.0 | 6.7 | 12.6 | 17.7 | 21.2 | 12.3 | 16.2 |
| Average diameter of short fiber | μ | 0.3 | 0.1 | 0.25 | 0.33 | 0.38 | 0.04 | 0.08 |
| Average Length of short fiber | μ | 3.2 | 3.8 | 3.1 | 4.5 | 4.7 | 1.2 | 1.0 |
| Average Length/average diameter | | 10.7 | 38.0 | 12.4 | 13.6 | 12.4 | 30.0 | 12.5 |

TABLE 1-2

| Microstructure | | Sample | | | | | | Ubepol* 150 |
|---|---|---|---|---|---|---|---|---|
| | | 8 | 9 | 10 | 11 | 12 | 13 | |
| cis-1,4-structure | Weight % | 82.3 | 86.3 | 85.3 | 84.4 | 83.1 | 87.1 | 97 |
| trans-1,4-structure | Weight % | 2.6 | 2.1 | 2.0 | 2.3 | 2.5 | 2.5 | 1.5 |
| syn-1,2-structure | Weight % | 15.1 | 11.6 | 12.7 | 13.3 | 14.4 | 14.4 | (1.5) |
| Average diameter of short fiber | μ | 0.9 | 1.2 | 0.3 | 0.42 | 0.55 | 0.1 | |
| Average Length of short fiber | μ | 7.6 | 9.8 | 0.76 | 11.5 | 4.2 | 6.7 | |
| Average Length/average diameter | | 8.4 | 8.2 | 2.5 | 27.3 | 7.6 | 67.0 | |

*cis-1,4-polybutadiene (Ube Industries Limited in Japan)

Various polybutadiene rubber compositions were obtained according to the following formula, using Samples 1-13 shown in Table 1-1 and Table 1-2, and Ubepol 150 (cis-1,4-polybutadiene rubber made by Ube Industries Limited in Japan) as the conventional product, individually.

The blending formula of various polybutadiene rubber compositions is given as follows:

| | |
|---|---|
| Natural rubber | 30 parts by weight |
| Sample 1-13 | Each 70 parts by weight |
| (Ubepol 150) | (70 parts by weight) |
| N-330-carbon black | 50 parts by weight |
| IA: 82 mg/g | |
| DBP: 102 ml/100 g | |
| Aromatic oil | 10 parts by weight |
| Stearic acid | 2.5 parts by weight |
| 810 NA*[1] | 2.0 parts by weight |
| Wax | 1.5 parts by weight |
| Zinc oxide | 4.0 Parts by weight |
| DM*[2] | 0.3 parts by weight |
| Nob*[3] | 0.4 parts by weight |
| Sulfur | 1.5 parts by weight |

*[1]N-phenyl-N'-isopropyl-p-phenylenediamine
*[2]di-2-benzothiazyl sulfide
*[3]N-oxydiethyl-2-benzothiazolyl sulfeneamide Mooney viscosity ($ML_{1+4}$), Mooney scorch time (MST), polymer dispersion degree and roll workability, and hardness (Hd), breaking strength (Tb), breaking elongation (Eb), 300% modulus (300 Md), crack growth resistance, and flex resistance of various polybutadiene rubber compositions after vulcanization at 150° C. and 80 kg/cm² for 30 minutes. The results are shown in Table 2-1 and Table 2-2.

Test procedures: $ML_{1+4}$ and MST were determined according to the procedure described in JIS K6300. Polymer dispersion degree was determined by mixing each components and observing the resulting mixture by electron microscope (magnification: ×5,000, dyed by $O_sO_4$). Roll workability was evaluated by the appearance of roll baggy in 10-inch roll. Hd, Tb, Eb and 300 Md were measured according to JIS K6301. The crack growth resistance is evaluated by an index representing the time required for growth of the initial 2 mm cut to 12 mm in a de Mattia machine (300 cycles/min.), in presuming the time of the conventional case as 100. Thus, the higher value means a better crack growth resistance. Flex resistance is evaluated by an index representing the time till an appearance of a crack in a de Mattia machine, in presuming the time of the conventional case as 100. Thus, the higher value means a better flex resistance.

As is evident from Table 1-1, 1-2 and Table 2-1, 2-2, (1) the polybutadiene rubber composition of the present invention having 6-20% by weight of syn-1,2-structures had better results (Examples 1-3 and Comparative Examples 1-2), (2) the average diameter of short fibers in a range of 0.05-1μ, formed from syn-1,2-polybutadiene gave better results (Examples 4-5 and Comparative Examples 3-4), and (3) the average length of short fibers in a range of 0.8-10μ, and a ratio of average length/average diameter of 8 or more, formed from syn-1,2-polybutadiene gave better results (Examples 2, and 5-6, and Comparative Examples 5-7).

TABLE 2-1

| | Comparative example 1 (Sample 1) | Example 1 (Sample 2) | Example 2 (Sample 3) | Example 3 (Sample 4) | Comparative example 2 (Sample 5) | Comparative example 3 (Sample 6) | Example 4 (Sample 7) |
|---|---|---|---|---|---|---|---|
| $ML_{1+4}$ | 44 | 45 | 46 | 48 | 45 | 46 | 47 |
| MST (min) | 12 | 11 | 11 | 11 | 12 | 11 | 11 |
| Dispersion of polymer | good | good | good | good | No dispersion | good | good |
| Workability of roll | slightly baggy | good | good | good | good | good | good |
| Hd (degree) | 55 | 57 | 61 | 65 | 63 | 55 | 64 |
| Tb (Kg/cm²) | 172 | 178 | 187 | 179 | 151 | 171 | 192 |
| Eb (%) | 568 | 551 | 560 | 552 | 376 | 570 | 565 |
| 300Md (Kg/cm²) | 72 | 79 | 81 | 89 | 85 | 67 | 87 |
| Crack growth resistance (index) | 100 | 236 | 472 | 560 | 82 | 115 | 498 |
| Flex resistance (index) | 120 | 145 | 710 | 860 | 55 | 105 | 745 |

TABLE 2-2

| | Example 5 (Sample 8) | Comparative example 4 (Sample 9) | Comparative example 5 (Sample 10) | Comparative example 6 (Sample 11) | Comparative example 7 (Sample 13) | Example 6 (Sample 13) | Conventional method |
|---|---|---|---|---|---|---|---|
| $ML_{1+4}$ | 53 | 68 | 44 | 63 | 45 | 50 | 45 |
| MST (min) | 11 | 11 | 12 | 11 | 12 | 11 | 11 |
| Dispersion of polymer | good | good | good | good | good | good | good |
| Workability of roll | good | good | Slightly baggy | Not easily doctor-knifed | good | good | good |
| Hd (degree) | 66 | 67 | 55 | 69 | 64 | 67 | 55 |
| Tb (Kg/cm²) | 169 | 154 | 149 | 170 | 170 | 184 | 171 |
| Eb (%) | 547 | 405 | 438 | 318 | 540 | 561 | 565 |
| 300Md (Kg/cm²) | 86 | 70 | 66 | 93 | 75 | 88 | 65 |
| Crack growth resistance (index) | 481 | 262 | 95 | 230 | 180 | 580 | 100 |
| Flex resistance (index) | 357 | 99 | 73 | 99 | 110 | 878 | 100 |

EXAMPLES 7-9 AND COMPARATIVE EXAMPLE 8

The crack growth resistance, the flex resistance and the breaking resistance characteristics and abrasion resistance of various polybutadiene rubber compositions blended as in Table 4, using samples 14-17 and Ubepol 150 as the conventional product shown in Table 3 were investigated.

The weight average molecular weight of cis-1,4-polybutadiene (cis-1,4-structures) shown in Table 3 was determined by dissolving various kinds of polybutadiene rubber in n-hexane, separating soluble matter from insoluble matter by centrifuge, and measuring the soluble matter (cis-1,4-polybutadiene) according to a light scattering method. Breaking resistance characteristic is evaluated by an index representing a depth of scar on the rubber sample (15 cm×10 cm×5.5 cm) made by falling a weight of 700 kg having an edge (edge angle: 45°) from a definite level by gravity in a one-swing type testing machine, in presuming the depth of scar on the conventional case as 100. Thus, the higher value means a better breaking resistance characteristic. Abrasion resistance is evaluated by an index representing an evaluation by pico abrasion defined in ASTM D2228, in presuming the evaluation of the conventional case as 100. The larger value means a better abrasion resistance.

As is evident from Table 4, the polybutadiene rubber composition of the present invention having a weight average molecular weight of 350,000 or more also have a better alvasion resistance, and thus can be preferably applied to tread rubber of tyre.

Mooney viscosity ($ML_{1+4}$), Mooney scorch time (MST), Polymer dispersion degree, and hardnes (Hd), breaking strength (Tb), breaking elongation (Eb), 300% modulus (300 Md), pico abrasion index and crack growth resistance after vulcanization at 150° C. and 80 $kg/cm^2$ for 30 minutes were investigated for each polybutadiene rubber, as shown in Table 6. Tyres were made by using the rubber chafer of the resulting rubber compositions, and made to run on a drum, and then the degree of appearance of rim dislocation were investigated. The results are shown in Table 6.

TABLE 3

| Microstructure | | Sample 14 | Sample 15 | Sample 16 | Sample 17 | Ubepol 150 |
|---|---|---|---|---|---|---|
| cis-1,4-structure | weight % | 85.2 | 86.7 | 88.2 | 79.8 | 97 |
| trans-1,4-structure | weight % | 2.2 | 2.1 | 2.0 | 3.2 | 1.5 |
| syn-1,2-structure | weight % | 12.6 | 11.2 | 9.8 | 17.0 | (1.5) |
| Average diameter of short fiber | | 0.23 | 0.22 | 0.24 | 0.18 | |
| Average length of short fiber | | 5.2 | 4.3 | 5.6 | 4.8 | |
| Average length/Average diameter | | 22.6 | 19.5 | 23.3 | 26.7 | |
| Weight average molecular weight of cis-1,4-polybutadiene | | $2.56 \times 10^5$ | $3.57 \times 10^5$ | $5.72 \times 10^5$ | $7.24 \times 10^5$ | $6.25 \times 10^5$ |

TABLE 4

| | Comparative example 8 | Example 7 | Example 8 | Example 9 | Conventional method |
|---|---|---|---|---|---|
| Natural rubber | 50 | 50 | 50 | 50 | 50 |
| Styrene-butadiene copolymer | 20 | 20 | 20 | 20 | 20 |
| Sample 14 | 30 | | | | |
| Sample 15 | | 30 | | | |
| Sample 16 | | | 30 | | |
| Sample 17 | | | | 30 | |
| Ubepol 150 | | | | | 30 |
| N-220 Carbon black* | 45 | | | | |
| Aromatic oil | 5 | | | | |
| Stearic acid | 2 | | | | |
| 810NA | 1.5 | | | | |
| Wax | 1.0 | " | " | " | " |
| Zinc oxide | 3.5 | | | | |
| DM | 0.4 | | | | |
| Nobs | 0.6 | | | | |
| Sulfur | 1.75 | | | | |
| (Results) | | | | | |
| Crack growth resistance (index) | 548 | 562 | 561 | 555 | 100 |
| Flex resistance (index) | 820 | 843 | 837 | 819 | 100 |
| Breaking resistance (index) | 131 | 130 | 128 | 135 | 100 |
| Abrasion resistance (index) | 85 | 105 | 128 | 130 | 100 |

*IA 121 mg/g, DBP 114 ml/100g

EXAMPLES 10–12 AND COMPARATIVE EXAMPLES 9–11

5 kinds of polybutadiene rubber having different microstructures shown in Table 5 were prepared, and

TABLE 5

| Microstructure | Sample 18 | Sample 19 | Sample 20 | Sample 21 | Sample 22 | BR01* |
|---|---|---|---|---|---|---|
| cis-1,4-structure weight (%) | 94.6 | 91.7 | 85.2 | 80.3 | 75.4 | 98.0 |
| trans-1,4-structure weight (%) | 0.9 | 1.5 | 2.3 | 2.7 | 3.0 | 1.3 |
| syn-1,2-structure weight (%) | 4.5 | 6.8 | 12.5 | 17.0 | 21.6 | 0.7 |

*cis-1,4-polybutadiene rubber (Japan Synthetic Rubber Co., Ltd.)

TABLE 6

| | Comparative example 9 | Example 10 | Example 11 | Example 12 | Comparative example 10 | Comparative example 11 |
|---|---|---|---|---|---|---|
| NR | 40 | 40 | 40 | 40 | 40 | 40 |
| Sample 18 | 60 | | | | | |

TABLE 6-continued

|  | Comparative example 9 | Example 10 | Example 11 | Example 12 | Comparative example 10 | Comparative example 11 |
|---|---|---|---|---|---|---|
| Sample 19 |  | 60 |  |  |  |  |
| Sample 20 |  |  | 60 |  |  |  |
| Sample 21 |  |  |  | 60 |  |  |
| Sample 22 |  |  |  |  | 60 |  |
| BR01 |  |  |  |  |  | 60 |
| N-220 Carbon black[*1] | 70 |  |  |  |  |  |
| Aromatic oil | 10 |  |  |  |  |  |
| Stearic acid | 2 |  |  |  |  |  |
| Tackyrol 130 | 2 | " | " | " | " | " |
| Zinc oxide | 5 |  |  |  |  |  |
| RD[*2] | 1 |  |  |  |  |  |
| DM[*3] | 1 |  |  |  |  |  |
| Nobs[*4] | 1 |  |  |  |  |  |
| Sulfur | 3 |  |  |  |  |  |
| (Results) |  |  |  |  |  |  |
| ML$_{1+4}$ | 70 | 73 | 78 | 82 | 80 | 70 |
| MST (min) | 12 | 11 | 11 | 12 | 11 | 11 |
| Polymer dispersion degree | good | good | good | good | No dispersion | good |
| Hd (degree) | 70 | 71 | 73 | 74 | 72 | 70 |
| Tb (Kg/cm$^2$) | 185 | 189 | 191 | 196 | 172 | 183 |
| Eb (%) | 204 | 206 | 201 | 198 | 182 | 206 |
| 300Md (Kg/cm$^2$) | 150 | 151 | 153 | 155 | 152 | 150 |
| Pico abrasion index | 200 | 214 | 224 | 232 | 218 | 180 |
| Crack growth resistance (index) | 99 | 170 | 425 | 490 | 210 | 100 |
| Appearance degree of rim discrepancy | Slight appearance | Not appearance |  |  |  | appearance |

[*1] IA 121 mg/g, DBP 114 ml/100 g
[*2] 2,2,4-trimethyl-1,2-dihydroquinoline polymer
[*3] di-2-benzothiazyldisulfide
[*4] N-oxydiethylene-2-benzothiazolylsulfeneamide As is evident from Table 6, the content of syn-1,2-structure is desirably in a range of 6–20% by weight, and the polybutadiene rubber composition can satisfactorily attain the object of rubber chafer when the pico abrasion index of the rubber composition is 210 or more.

Test procedures: ML$_{1+4}$ and MST were determined according to the procedure described in JIS K6300. The polymer dispersion degree was determined by mixing the components and observing the resulting mixture by electron microscope (magnification: ×5,000, dyed by O$_s$O$_4$). Hd, Tb, Eb and 300 Md were measured according to JIS K6301. The crack growth resistance is evaluated by an index representing the time required for the growth of the initial 2 mm cut to 12 mm in a de Mattia machine (300 cycles/min.), in presuming the time in Comparative Example 11 as 100. Thus, the higher value means a better crack growth resistance.

The degree of appearance of rim dislocation was determined by mounting a rubber chafer made from a rubber composition of Table 6 at a tyre size 165 SR13, making it run on a steel drum in an equivalent distance of 10,000 km at a tyre inner pressure of 2.3 kg/cm$^2$, a 150% over-load over the designed rated load and a speed of 100 kg/hr, and then dissecting the tyre to inspect a rim dislocation on the rubber chafer surface.

EXAMPLES 13–15 AND COMPARATIVE EXAMPLES 12 AND 13

The workability (roll baggy), the pico abrasion index, and the crack growth resistance of the rubber compositions shown in Table 7 were evaluated in the same manner as in Example 10, while changing the blend proportion of the diene rubber. Results are shown also in Table 7. The crack growth resistance is evaluated by an index based on presuming that of Comparative Example 11 as 100.

TABLE 7

|  | Comparative example 12 | Example 13 | Example 14 | Example 15 | Comparative example 13 |
|---|---|---|---|---|---|
| NR | 70 | 55 | 35 | 5 | 0 |
| Sample 20 | 30 | 45 | 65 | 95 | 100 |
| N-220 Carbon black | 70 |  |  |  |  |
| Aromatic oil | 6 |  |  |  |  |
| Stearic acid | 2 |  |  |  |  |
| Tackyrol 130 | 2 |  |  |  |  |
| Zinc oxide | 5 | " | " | " | " |
| RD | 1 |  |  |  |  |
| DM | 1 |  |  |  |  |
| Nobs | 1 |  |  |  |  |
| Sulfur | 3 |  |  |  |  |
| Workability (roll baggy) | good | good | good | fairly good | not good |
| Pico abrasion index | 203 | 211 | 230 | 252 | 256 |

TABLE 7-continued

|  | Comparative example 12 | Example 13 | Example 14 | Example 15 | Comparative example 13 |
|---|---|---|---|---|---|
| Crack growth resistance | 490 | 460 | 360 | 108 | 89 |

As is evident from Table 7, a good result can be obtained in the application to the rubber chafer by 40–95 parts by weight of the polybutadiene rubber of the present invention in 100 parts by weight of the rubber.

EXAMPLES 16–18 AND COMPARATIVE EXAMPLES 14–16

The rubber compositions shown in Table 9 using various kinds of carbon black shown in Table 8 were evaluated in the same manner as in Example 10, and results are given in Table 9. The crack growth resistance is evaluated by an index based on presuming the value of Comparative Example 11 as 100.

TABLE 8

|  | N-351 | N-339 | N-332 | N-327 | N-234 | N-219 |
|---|---|---|---|---|---|---|
| IA mg/g | 67 | 90 | 84 | 86 | 118 | 118 |
| DBP ml/100 g | 120 | 120 | 102 | 60 | 125 | 78 |

EXAMPLES 19–21 AND COMPARATIVE EXAMPLES 17–19

5 kinds of polybutadiene having different microstructures shown in Table 10 were prepared, and Mooney viscosity ($ML_{1+4}$), Mooney scorch time (MST), and the polymer dispersion degree, and after vulcanization at 150° C. and 80 kg/cm² for 30 minutes, hardness (Hd), breaking strength (Tb), breaking elongation (Eb), 300% modulus (300 Md), crack growth resistance, and flex resistance of each rubber after blended as shown in Table 11 were measured. Results are given in Table 11.

TABLE 10

| Microstructure | Sample 23 | Sample 24 | Sample 25 | Sample 26 | Sample 27 | BR01* |
|---|---|---|---|---|---|---|
| cis-1,4-structure weight (%) | 94.6 | 91.7 | 85.2 | 80.3 | 75.4 | 98.0 |
| trans-1,4-structure weight (%) | 0.9 | 1.5 | 2.3 | 2.7 | 3.0 | 1.3 |
| syn-1,2-structure weight (%) | 4.5 | 6.8 | 12.5 | 17.0 | 21.6 | 0.7 |

*cis-1,4-polybutadiene rubber (Japan Synthetic Rubber Co., Ltd.)

TABLE 9

|  | Comparative example 14 | Example 16 | Example 17 | Comparative example 15 | Example 18 | Comparative example 16 |
|---|---|---|---|---|---|---|
| NR | 40 | " | " | " | " | " |
| Sample 20 | 60 |  |  |  |  |  |
| N-351 Carbon black | 70 |  |  |  |  |  |
| N-339 Carbon black |  | 70 |  |  |  |  |
| N-332 Carbon black |  |  | 70 |  |  |  |
| N-327 Carbon black |  |  |  | 70 |  |  |
| N-234 Carbon black |  |  |  |  | 70 |  |
| N-219 Carbon black |  |  |  |  |  | 70 |
| Aromatic oil | 6 |  |  |  |  |  |
| Stearic acid | 2 |  |  |  |  |  |
| Tackyrol 130 | 2 |  |  |  |  |  |
| Zinc oxide | 5 | " | " | " | " | " |
| RD | 1 |  |  |  |  |  |
| DM | 1 |  |  |  |  |  |
| Nobs | 1 |  |  |  |  |  |
| Sulfur | 3 |  |  |  |  |  |
| Pico abrasion index | 190 | 220 | 216 | 210 | 228 | 246 |
| Crack growth resistance (index) | 210 | 350 | 190 | 96 | 450 | 84 |

As is evident from the results of Table 9, a good result as the rubber chafer can be obtained in the present invention by using carbon black having the IA of 76 mg/g or more, and the DBP of 90 ml/100 g or more.

TABLE 11

|  | Comparative example 17 | Example 19 | Example 20 | Example 21 | Comparative example 18 | Comparative example 19 |
|---|---|---|---|---|---|---|
| NR | 30 | 30 | 30 | 30 | 30 | 30 |
| Sample 23 | 70 |  |  |  |  |  |
| Sample 24 |  | 70 |  |  |  |  |
| Sample 25 |  |  | 70 |  |  |  |
| Sample 26 |  |  |  | 70 |  |  |
| Sample 27 |  |  |  |  | 70 |  |
| BR01 |  |  |  |  |  | 70 |
| N-550 Carbon black*¹ | 60 |  |  |  |  |  |
| Aromatic oil | 20 |  |  |  |  |  |
| Stearic acid | 2 |  |  |  |  |  |
| 810NA*² | 2 | " | " | " | " | " |
| Wax | 2 |  |  |  |  |  |
| Zinc oxide | 4 |  |  |  |  |  |

TABLE 11-continued

| | Comparative example 17 | Example 19 | Example 20 | Example 21 | Comparative example 18 | Comparative example 19 |
|---|---|---|---|---|---|---|
| DM*3 | 0.3 | | | | | |
| Nobs*4 | 0.4 | | | | | |
| Sulfur | 1.5 | 1.4 | 1.4 | 1.3 | 1.3 | 1.5 |
| (Results) | | | | | | |
| $ML_{1+4}$ | 44 | 45 | 46 | 48 | 45 | 43 |
| MST (min) | 12 | 11 | 12 | 11 | 11 | 11 |
| Polymer dispersion degree | good | good | good | good | No dispersion | good |
| Hd (degree) | 55 | 55 | 55 | 55 | 55 | 55 |
| Tb ($Kg/cm^2$) | 170 | 175 | 180 | 184 | 142 | 168 |
| Eb (%) | 568 | 558 | 555 | 563 | 475 | 574 |
| 300Md ($Kg/cm^2$) | 65 | 65 | 66 | 65 | 63 | 65 |
| Crack growth resistance (index) | 100 | 300 | 455 | 540 | 240 | 100 |
| Flex resistance (index) | 120 | 315 | 610 | 825 | 94 | 100 |

*1 IA 43mg/g, DBP 121mg/100g
*2 N-phenyl-N'-isopropyl-p-phenylenediamine
*3 di-2-benzothiazyldisulfide
*4 N-oxydiethylene-2-benzothiazolylsulfeneamide As is evident from Table 11, a good result can be obtained in a range of 6–20% by weight of syn-1,2-structures.

Test procedures: $ML_{1-4}$ and MST were determined according to the procedure described in JIS K6300. The polymer dispersion degree was determined by mixing the components and observing the resulting mixture by electron microscope (magnification: ×5,000, dyed by $O_sO_4$). Hd, Tb, Eb and 300 Md were measured according to JIS K6301. The crack growth resistance is evaluated by an index representing the time required for growth of the initial 2 mm cut to 12 mm in a de Mattia machine (300 cycles/min.), in presuming the time of Comparative Example 19 as 100. Thus, the higher value means a better crack growth resistance. Flex resistance is evaluated by an index representing the time till an appearance of a crack in a de Mattia machine, in presuming the time of Comparative Example 19 as 100. Thus, the higher value means a better flex resistance.

EXAMPLES 22–24 AND COMPARATIVE EXAMPLE 20 AND 21

The workability (roll baggy), the flex resistance and the crack growth resistance of rubber compositions shown in Table 12 were evaluated in the same manner as in Example 19 by changing a blend ratio of the diene rubber, and results are shown in Table 12. The flex resistance and the crack growth resistance are indicated based on presuming the values of Comparative Example 19 as 100.

TABLE 12

| | Comparative example 20 | Example 22 | Example 23 | Example 24 | Comparative example 21 |
|---|---|---|---|---|---|
| NR | 70 | 55 | 35 | 5 | 0 |
| Sample 25 | 30 | 45 | 65 | 95 | 100 |
| N-550 Carbon black | 60 | | | | |
| Aromatic oil | 20 | | | | |
| Stearic acid | 2 | | | | |
| 810NA | 2 | | | | |
| Wax | 2 | " | " | " | " |
| Zinc oxide | 4 | | | | |
| DM | 0.3 | | | | |
| Nobs | 0.4 | | | | |
| Sulfur | 1.4 | | | | |
| (Results) | | | | | |
| Workability (roll baggy) | good | good | good | fairly good | not good |
| Crack growth resistance (index) | 490 | 490 | 450 | 86 | 42 |
| Flex resistance (index) | 72 | 250 | 600 | 690 | 690 |

As is evident from Table 12, a good results can be obtained by 40–95 parts by weight of polybutadiene rubber of the present invention in 100 parts by weight of rubber.

EXAMPLES 25–27 AND COMPARATIVE EXAMPLES 22–24

Blends of the polybutadiene rubber of the present invention with various kinds of diene rubber were evaluated in the same manner as in Example 19, and the crack growth resistance and the flex resistance of Examples 25 in Table 13 are indicated based on presuming those of Comparative Example 22 as 100, those of Example 26 on those of Comparative Example 23 as 100, and those of Example 27 on those of Comparative Example 24 as 100.

TABLE 13

| | Example 25 | Comparative example 22 | Example 26 | Comparative example 23 | Example 27 | Comparative example 24 |
|---|---|---|---|---|---|---|
| NR | 20 | 20 | | | 20 | 20 |
| SBR | 30 | 30 | | | | |
| IR | | | 30 | 30 | 10 | 10 |
| Sample 25 | 50 | | 70 | | 70 | |
| BR01 | | 50 | | 70 | | 70 |
| N-550 Carbon black | 55 | 55 | 60 | | | |
| Stearic acid | 2 | 2 | 2 | | | |
| Aromatic oil | 20 | 20 | 20 | | | |
| 810NA | 2 | 2 | 2 | " | " | " |
| Wax | 2 | 2 | 2 | | | |
| Zinc oxide | 3 | 3 | 4 | | | |
| DM | 0.5 | 0.5 | 0.3 | | | |
| Nobs | | | 0.4 | | | |
| DPG | 0.3 | 0.3 | | | | |
| Sulfur | 1.4 | 1.5 | 1.4 | 1.5 | 1.4 | 1.5 |
| (Results) | | | | | | |
| Crack growth resistance (index) | 490 | 100 | 430 | 100 | 470 | 100 |
| Flex resistance (index) | 725 | 100 | 570 | 100 | 600 | 100 |

As is evident from Table 13, the polybutadiene rubber of the present invention is better, even if blended with various kinds of the diene rubber, as compared with the conventional cis-1,4-polybutadiene rubber.

EXAMPLES 28–30 AND COMPARATIVE EXAMPLES 25–27

The crack growth resistance and the flex resistance of rubber compositions shown in Table 15 were evaluated in the same manner as in Example 19 by using various kinds of the carbon black shown in Table 14 by way of indicating based on presuming those of Comparative Example 19 as 100, and results are given in Table 15.

TABLE 14

| | Carbon black | | | | | |
|---|---|---|---|---|---|---|
| Properties | N-762 | N-650 | N-568 | N-363 | N-326 | N-285 |
| IA mg/g | 26 | 36 | 45 | 66 | 82 | 102 |
| DBP ml/100 g | 62 | 125 | 132 | 68 | 71 | 126 |

As is evident from Table 15, a satisfactory result can be obtained by using carbon black having the IA of 30–90 mg/g and the DBP of 130 ml/100 g or less.

EXAMPLES 31–33 AND COMPARATIVE EXAMPLES 28–34

The workability (roll baggy), aging by heat and aging by ozone were investigated by blending various kinds of the antioxidant shown in Table 16, and the results are given in Table 16.

Aging by heat were represented by percent retention of Tb and Eb after aging at 100° C. for 72 hours, compared with those before aging, according to JIS K6301. Aging by ozone was evaluated by way of the time till breaking of a sample according to ASTM D-3395-75.

As is evident from Table 16, not only the workability but also the aging by heat and ozone can be considerably improved by a synergistic effect by blending the polybutadiene rubber of the present invention with the antioxidant of p-phenylenediamine group.

TABLE 15

| | Comparative example 25 | Example 28 | Comparative example 26 | Example 29 | Example 30 | Comparative example 27 |
|---|---|---|---|---|---|---|
| NR | 30 | " | " | " | " | " |
| Sample 25 | 70 | | | | | |
| N-762 | 60 | | | | | |
| N-650 | | 60 | | | | |
| N-568 | | | 60 | | | |
| N-363 | | | | 60 | | |
| N-326 | | | | | 60 | |
| N-285 | | | | | | 60 |
| Aromatic oil | 20 | | | | | |
| Stearic acid | 2 | | | | | |
| 810NA | 2 | | | | | |
| Wax | 2 | " | " | " | " | " |
| Zinc oxide | 3 | | | | | |
| DM | 0.3 | | | | | |
| Nobs | 0.4 | | | | | |
| Sulfur | 1.4 | | | | | |
| (Results) | | | | | | |
| Crack growth resistance (index) | 340 | 200 | 85 | 470 | 290 | 97 |
| Flex resistance (index) | 82 | 180 | 320 | 650 | 420 | 150 |

TABLE 16

|  | Ex. 31 | Ex. 32 | Ex. 33 | Comp. ex. 28 | Comp. ex. 29 | Comp. ex. 30 | Comp. ex. 31 | Comp. ex. 32 | Comp. ex. 33 | Comp. ex. 34 |
|---|---|---|---|---|---|---|---|---|---|---|
| NR | 70 |  |  |  |  |  |  | 70 |  |  |
| Sample 25 | 30 |  |  |  |  |  |  |  |  |  |
| BR01 |  |  |  |  |  |  |  | 30 |  |  |
| N-550 Carbon black | 60 |  |  |  |  |  |  | 60 |  |  |
| Aromatic oil | 20 | " | " | " | " | " | " | 20 | " | " |
| Stearic acid | 2 |  |  |  |  |  |  | 2 |  |  |
| Wax | 2 |  |  |  |  |  |  | 2 |  |  |
| 810 NA | 2 |  |  |  |  |  |  | 2 |  |  |
| Santflex 13*[1] |  | 2 |  |  |  |  |  |  | 2 |  |
| DP*[2] |  |  | 2 |  |  |  |  |  |  |  |
| D*[3] |  |  |  | 2 |  |  |  |  |  |  |
| RD*[4] |  |  |  |  | 2 |  |  |  |  | 2 |
| No crack SP*[5] |  |  |  |  |  | 2 |  |  |  |  |
| MB*[6] |  |  |  |  |  |  | 2 |  |  |  |
| Zinc oxide | 3 |  |  |  |  |  |  |  |  |  |
| DM | 0.3 |  |  |  |  |  |  |  |  |  |
| Nobs | 0.4 | " | " | " | " | " | " | " | " | " |
| Sulfur | 1.4 |  |  |  |  |  |  |  |  |  |
| (Result) |  |  |  |  |  |  |  |  |  |  |
| Workability (Roll baggy) | good | good | good | not good | not good | not good | not good | not good | not good | not good |
| Tb Retention % | 90 | 91 | 87 | 71 | 73 | 67 | 62 | 69 | 71 | 71 |
| Eb Retention % | 82 | 84 | 78 | 70 | 72 | 58 | 51 | 71 | 71 | 69 |
| Dynamic ozone test (hrs) | 13 | 15 | 13 | 10 | 7 | 6 | 5 | 9 | 10 | 9 |

*[1] N-phenyl-N'-(2,4-dimethyl)butyl-p-phenylenediamine
*[2] N,N'-diphenyl-p-phenylenediamine
*[3] Phenyl-2-naphthylamine
*[4] 2,2,4-trimethyl-1,2-dihydroquinoline
*[5] [Mono-(or di-, or tri-)(α-methylbenzyl)phenol]
*[6] 2-mercapto benzoimidazole

What is claimed is:

1. A composition comprising a polybutadiene rubber containing a polymer obtained by block or graft polymerization of cis-1,4-polybutadiene with syndiotactic(-syn)-1,2-polybutadiene in which a microstructure is of 78 to 93% by weight of cis-1,4-structure and 6 to 20% by weight of syn-1,2-structure, at least 40% by weight of said syn-1,2-polybutadiene being crystallized and in a short fiber-like shape having an average diameter of 0.05 to 1μ and an average length of 0.8 to 10μ.

2. A composition as claimed in claim 1, which further comprises at least one other diene rubber selected from the group consisting of natural rubber, polyisoprene rubber, styrene-butadiene copolymer and cis-1,4-polybutadiene rubber, and an inorganic filler.

3. A composition as claimed in claim 2, in which 20 to 120 parts by weight of the inorganic filler is blended per 100 parts by weight of the polybutadiene rubber.

4. A composition as claimed in claim 2, in which the ratio of average fiber length to average diameter of the syn-1,2-polybutadiene short fiber is at least 8.

5. A composition as claimed in claim 4, in which a carbon black as said filler having an iodine absorption number (IA) of 76 mg/g or more and a dibutyl phthalate oil absorption number (DBP) of 90 ml/100 g or more is combined by 40 to 100 parts by weight relative to 100 parts by weight of blended polybutadiene rubber prepared by blending 40 to 95 parts by weight of said polybutadiene rubber and 5 to 60 parts by weight of said other diene rubber, so that a pico abrasion index defined by ASTM D2228 of the polybutadiene rubber composition is 210 or more.

6. A composition as claimed in claim 5, in which the IA of the carbon black is 86 mg/g or more and the DBP of the carbon black is 105 ml/100 g or more.

7. A composition as claimed in claim 4, in which a carbon black as said filler having an IA of 30 to 90 mg/g and a DBP of 130 ml/100 g or less is combined by 30 to 100 parts by weight relative to 100 parts by weight of blended polybutadiene rubber prepared by blending 40 to 95 parts by weight of said polybutadiene rubber and 5 to 60 parts by weight of said other diene rubber, and an antioxidant and p-phenylenediamine group is further combined by 0.5 to 8 parts by weight relative to 100 parts by weight of said blended polybutadiene rubber.

8. A composition as claimed in claim 7, in which the antioxidant of p-phenylenediamine group is at least one selected from the group consisting of N-phenyl-N'-isopropyl-p-phenylenediamine, N,N'-diphenyl-p-phenylenediamene, N-phenyl-N'-(2,4-dimethyl)butyl-p-phenylenediamine and N,N'-di-2-naphthyl-p-phenylenediamine.

9. A composition as claimed in claim 4, in which a carbon black as said filler having IA of 60 mg/g or more and a DBP of 70 ml/100 g or more is combined by 30 to 100 parts by weight relative to 100 parts by weight of blended polybutadiene rubber prepared by blending 40 to 95 parts by weight of said polybutadiene rubber and 5 to 60 parts by weight of said other diene rubber.

10. A composition as claimed in claim 9, in which a weight average molecular weight of said cis-1,4-polybutadiene is 350,000 or more.

* * * * *